United States Patent Office 3,287,439

Patented Nov. 22, 1966

3,287,439

HYDROCARBON CONVERSION PROCESS

Robert M. Suggitt, Fishkill, and John H. Estes, Wappingers Falls, N.Y., and Kenneth D. Ashley, Sarasota, Fla., assignors to Texaco Inc., New York, N.Y., a corporation of Delaware No Drawing. Filed Apr. 30, 1963, Ser. No. 276,981

3 Claims. (Cl. 260—683.68)

This invention relates to a hydrocarbon conversion process and, more particularly, to a process and catalyst for the isomerization of isomerizable hydrocarbons. In accordance with this invention, an isomerizable hydrocarbon is contacted under isomerizing conditions with a platinized alumina activated by contact with a chloride activating agent comprising a chlorofluorocarbon having an atomic ratio of chlorine to carbon of at least 2 to 1.

Our catalyst is prepared by compositing platinum with alumina forming a composite comprising a major portion of alumina and about 0.01 to 1.0 percent by weight platinum. This composite is contacted with a chloride activating agent, for example, dichlorofluoromethane, dichlorodifluoromethane, and trichlorofluoromethane, at a temperature within the range of about 300 to 650° F. forming a chlorided composite containing within the range of about 3.0 to 10.0 percent by weight chlorine. This chlorided composite is preferably heated to a temperature within the range of about 400 to 1,000° F. effecting removal of a part of the chlorine content forming a catalyst containing within the range of about 2.5 to 7.0 weight percent chlorine. The resulting chloride activated catalyst is highly active in the isomerization of paraffin hydrocarbons at a temperature within the range of about 200 to 400° F., at a liquid hourly space velocity within the range of about 0.5 to 2.0 and with a hydrogen to hydrocarbon mol ratio within the range of about 0.10:1 to 5.0:1.

Highly active isomerization catalysts prepared by the activation of a platinized alumina composite with a chlorohydrocarbon or an acid chloride are described in application S.N. 102,668 and application S.N. 102,641 both filed April 13, 1961. These catalysts are prepared by adding platinum to alumina in an amount within the range of about 0.01 to about 1.0 weight percent of the calcined alumina. The platinum is added by any of various well known methods including, for example, impregnation with a water-soluble platinum containing compound such as chloroplatinic acid, or precipitation of platinum as sulfide by passing hydrogen sulfide through an aqueous solution of a platinum compound. The platinum-alumina composite is then activated by treatment with a chloride activating agent under conditions effective to react at least a portion of said activating agent with at least one component of said composite. The platinum-alumina composite is contacted with a chloride activating agent in an amount within the range of about 3.0 to 15.0 percent by weight of the platinum-alumina composite. The chloride platinum-alumina mixture is activated at a temperature of at least 300° F. and preferably within the range of about 300 to 650° F. The duration of the activation step and the rate of heating do not appear critical so long as control is maintained and uniform conditions are achieved. The catalyst thus prepared has a high activity for the isomerization of hydrocarbons, for example, butane, normal pentane and hexanes, and gasoline hydrocarbon fractions. The activated catalyst prepared in accordance with this method may be in pellet, granular, bead, or pulverulent form to facilitate its used in fixed beds, moving beds, or fluidized solids beds as is well known in the art.

Chloride activated platinized alumina catalyst may be stabilized and its activity further enhanced by the heat-treatment described in copending application S.N. 242,886 filed December 7, 1962. In this method of heat-treatment, the chloride activating agent remaining in contact with the activated catalyst is displaced and the activated catalyst heated to a temperature within the range of about 400 to 1,000° F. The heat-treatment is continued for a period of about 2 to 10 hours. During this heat-treatment, gases are evolved from the catalyst comprising predominately hydrogen chloride together with minor amounts of carbon dioxide and other acidic gases.

We have found that high isomerization activity may be imparted to a platinum-alumina composite by contact with a chlorofluorocarbon having an atomic ratio of chlorine to carbon of at least 2 to 1. We have found that fluorine is not the equivalent of chlorine in imparting isomerization activity to the catalyst and compounds containing fluorine but no chlorine, such as carbon tetrafluoride, are ineffective as activating agents. However, the introduction of fluorine into the activating agent is highly advantageous in that chlorofluorocarbons are relatively nontoxic, nonirritating and noncorrosive. They may be handled in vapor phase at ambient atmospheric temperatures and are readily available through commercial sources.

The chlorofluorocarbon activated isomerization catalyst is highly active at relatively low temperatures. Gasoline fractions, for example, light straight run gasoline and natural gasoline, are treated at temperatures of about 200 to 350° F. and preferably within the range of about 280 to 300° F. Hydrocarbon streams consisting chiefly of pentanes and hexanes are isomerized at temperatures within the range of about 250 to 350° F. and preferably within the range of about 280 to 300° F. Butane isomerization is effected at temperatures within the range of 300 to 400° F. and preferably within the range of 315 to 350° F. Isomerization may be effected in either the liquid or vapor phase. Pressure has been found to have little effect in our process, other than determining whether liquid or vapor phase conditions prevail, and pressures within the range of 300 to 500 pounds per square inch gauge have been found convenient. A liquid hourly space velocity, that is the volume of liquid charged per hour per volume of catalyst, within the range of about 0.5 to 2.0 and preferably within the range of about 0.75 to 1.5 is employed. Hydrogen is included in the isomerization feed in a mol ratio of hydrogen to hydrocarbon within the range of about 0.10:1 to 5:1 and preferably within the range of about 2:1 to 4:1 for hexanes and 0.1:1 to 1:1 for butanes.

EXAMPLE A

A catalyst base is prepared by calcining beta alumina trihydrate forming eta alumina. Platinum in an amount of 0.6 weight percent is deposited on the eta alumina from a solution of chloroplatinic acid. The platinized eta alumina composite is contacted with dichlorodifluoromethane vapor at 500° F. for 1.5 hours forming an activated platinized eta alumina containing 4.2 weight percent chlorine, 6.8 weight percent fluorine and 0.5 weight percent platinum. A portion of this activated platinized alumina catalyst is employed for the isomerization of normal hexane feed stock at the following conditions:

| | |
|---|---|
| Liquid hourly space velocity | 1.0 |
| Temperature, ° F. | 300 |
| Pressure, pounds per sq. in. gauge | 300 |
| Hydrogen to hydrocarbon mol ratio | 3.0 |

Analysis of the normal hexane feed stock, the products of three tests made at the above conditions and the corresponding equilibrium of hexane isomers at the test conditions are shown in Table I following:

*Table I*

| | Feed Stock | Products | | | Equilibrium Distribution at 300° F. |
|---|---|---|---|---|---|
| | | Test A | Test B | Test C | |
| Pentane and lighter | | 0.7 | 0.7 | 0.6 | |
| Normal Hexane | 96.7 | 14.8 | 13.9 | 14.5 | 9.2 |
| 2-Methyl Pentane | | 36.2 | 38.6 | 38.2 | 30.1 |
| 3-Methyl Pentane | 1.1 | 18.4 | 18.8 | 18.7 | 14.7 |
| 2,2-Dimethyl Butane | | 20.0 | 18.4 | 19.6 | 36.5 |
| 2,3-Dimethyl Butane | | 7.6 | 7.3 | 6.0 | 9.5 |
| Cyclics | 2.2 | 1.3 | 1.3 | 1.4 | |

It will be noted that in each test, more than 95 percent of the normal hexane feed stock is converted to branched chain isomers. Surprisingly, the yields of 2-methyl pentane and 3-methyl pentane exceed the equilibrium distribution at the temperature employed.

EXAMPLE B

A portion of the platinized eta alumina composite employed in Example A is contacted with carbon tetrafluoride vapor at 500° F. and a second portion at 650° F. forming composites containing 3.5 and 5.3 weight percent fluorine respectively. When n-hexane is contacted with these composites at the conditions employed in Example A, there is zero weight percent conversion to branched chain hexanes. This example shows that although fluorine may be added to a platinum-alumina composite by contact with a fluorocarbon, low temperature isomerization activity is not imparted by fluorine alone.

EXAMPLE C

A platinum-alumina composite containing combined halogen is prepared by treating an alumina sol with hydrofluoric and hydrochloric acid prior to impregnation with platinum. The platinized gamma alumina has the following composition: 0.4 weight percent platinum, 0.3 weight percent chlorine, and 0.4 weight percent fluorine. The foregoing platinized alumina is contacted with n-hexane at 300° F., 1 liquid hourly space velocity, and with a hydrogen to hydrocarbon ratio of 2:1 and no conversion to branched chain isomers is obtained. This example shows that chlorine and fluorine added by treatment of alumina with mineral acid prior to impregnation with platinum are ineffective to impart low temperature isomerization activity.

We claim:

1. The method of isomerizing a paraffinic hydrocarbon selected from the group consisting of butanes, pentanes and hexanes which comprises contacting said hydrocarbon at isomerization conditions including a temperature within the range of about 200 to 400° F., a liquid hourly space velocity within the range of 0.5 to 2.0 and a hydrogen to hydrocarbon mole ratio within the range of about 0.10:1 to 5.0:1 with a catalyst consisting essentially of alumina, platinum, fluorine, and chlorine, wherein at least a part of said fluorine and said chlorine is introduced into said catalyst by contacting a composite of platinum and alumina with dichlorodifluoromethane at a temperature within the range of about 300 to 650° F.

2. The method of preparing a catalyst which comprises compositing platinum with alumina forming a composite consisting essentially of a major portion of alumina and about 0.01 to 1.0 percent by weight platinum and contacting said composite with dichlorodifluoromethane at a temperature within the range of about 300 to 650° F. forming a composite consisting essentially of platinum, alumina, fluorine and chlorine and containing within the range of about 3.0 to 10.0 percent by weight chlorine.

3. The catalyst prepared by the method of claim 2.

References Cited by the Examiner

UNITED STATES PATENTS

| | | | |
|---|---|---|---|
| 2,642,384 | 6/1953 | Cox | 208—139 |
| 2,798,105 | 7/1957 | Heineman et al. | 260—683.65 |
| 2,908,735 | 10/1959 | Haensel | 260—683.68 |
| 2,939,897 | 6/1960 | Beber et al. | 260—683.68 |
| 2,944,097 | 7/1960 | Starnes et al. | 260—683.68 |
| 2,952,716 | 9/1960 | Haensel | 260—683.65 |
| 2,966,528 | 12/1960 | Haensel | 260—683.65 |
| 3,138,559 | 6/1964 | Hauptschein et al. | 252—442 |
| 3,240,840 | 3/1966 | Goble et al. | 260—683.47 |

FOREIGN PATENTS

| | | |
|---|---|---|
| 618,613 | 10/1962 | Belgium. |
| 619,614 | 10/1962 | Belgium. |
| 1,299,388 | 6/1962 | France. |
| 1,310,818 | 10/1962 | France. |

DELBERT E. GANTZ, *Primary Examiner.*

ALPHONSO D. SULLIVAN, *Examiner.*

C. R. DAVIS, R. H. SHUBERT, *Assistant Examiners.*

UNITED STATES PATENT OFFICE

CERTIFICATE OF CORRECTION

Patent No. 3,287,439 November 22, 1966

Robert M. Suggitt et al.

It is hereby certified that error appears in the above numbered patent requiring correction and that the said Letters Patent should read as corrected below.

Column 1, line 71 for "used" read -- use --; column 2, line 72, for "3.0" read -- 3.2 --.

Signed and sealed this 29th day of August 1967.

(SEAL)
Attest:

ERNEST W. SWIDER
Attesting Officer

EDWARD J. BRENNER
Commissioner of Patents